United States Patent [19]

Adachi

[11] 4,161,867

[45] Jul. 24, 1979

[54] HYDRAULIC BRAKE BOOSTER

[75] Inventor: Yoshiharu Adachi, Toyota, Japan

[73] Assignee: Aisin Seiki Kabushiki Kaisha, Aichi, Japan

[21] Appl. No.: 877,520

[22] Filed: Feb. 13, 1978

Related U.S. Application Data

[63] Continuation of Ser. No. 628,547, Nov. 3, 1975, abandoned.

[30] Foreign Application Priority Data

Nov. 12, 1974 [JP] Japan ............................. 49/130224

[51] Int. Cl.² .......................................... B60T 13/14
[52] U.S. Cl. ................................ 60/547 A; 60/405; 60/548; 60/582; 91/28
[58] Field of Search ............... 60/548, 568, 404, 582, 60/547, 553, 593, 405, 547 A; 91/28, 372, 373, 376 R, 29, 31, 32, 5

[56] References Cited

U.S. PATENT DOCUMENTS

| | | | |
|---|---|---|---|
| 3,633,363 | 1/1972 | Larsen | 60/548 |
| 3,719,044 | 3/1973 | Bach | 60/547 |
| 3,733,817 | 5/1973 | MacDuff | 60/405 |
| 3,898,809 | 8/1975 | Baker | 60/548 |

*Primary Examiner*—Abraham Hershkovitz
*Attorney, Agent, or Firm*—Oblon, Fisher, Spivak, McCelland & Maier

[57] ABSTRACT

A hydraulic brake booster mechanism for use with an open or circulating fluid pressure system includes a divider valve for the fluid flow interposed between a source of continuously circulating fluid pressure and a power steering mechanism, a control valve operatively associated with a brake pedal for applying the brakes, and a change-over valve actuated by means of the displacement of the divider valve upon the failure of the source to deliver the fluid pressure from an accumulator to the control valve for assuring an emergency application of the brakes.

8 Claims, 1 Drawing Figure

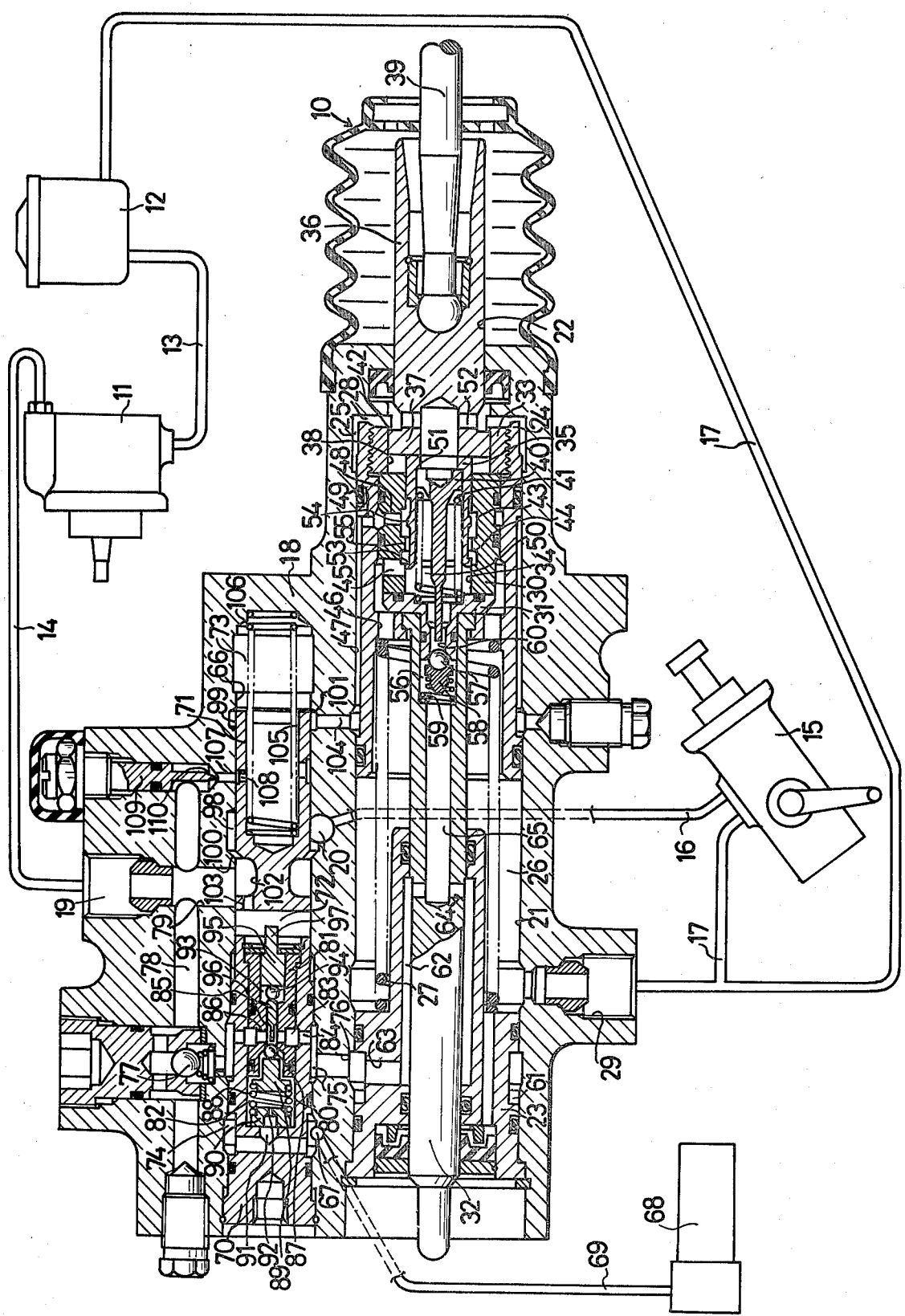

«4,161,867»

HYDRAULIC BRAKE BOOSTER

This is a continuation of application Ser. No. 628,547 filed Nov. 3, 1975, now abandoned.

BACKGROUND OF THE INVENTION

1. Field of the Invention

The present invention relates generally to hydraulic brake boosters for use with an open or circulating fluid pressure system, and more particularly to a hydraulic brake booster mechanism which facilitates an emergency application of the brakes upon the failure of the pressure source.

2. Description of the Prior Art

Conventionally, the various brake booster mechanisms, with emergency brake application means, which have been proposed include a first valve means for controlling or delivering the fluid pressure from a pump to a power piston for the brakes, and a second valve means for delivering the emergency fluid pressure to the power piston for the brakes upon the failure of the fluid source or pump.

The second valve means, however, is arranged and designed to be opened or operated by means of an excessive movement of the first valve means, and consequently, there is a disadvantage in that the second valve means is forced to be opened due to a sudden brake application being required or an excessive force acting upon the brake booster depending upon the excessive depression force of the brake pedal or the like even when the pump normally operates. The emergency fluid pressure within the accumulator is then used for the brakes even during the normal condition of the fluid source, and thus, the emergency fluid pressure or supply of the accumulator may be depleted. This results in a lack of emergency pressure for the brakes when the emergency fluid pressure is in fact required.

SUMMARY OF THE INVENTION

Accordingly, it is an object of the present invention to provide a brake booster mechanism which obviates the various drawbacks of the conventional devices as mentioned above.

Another object of the present invention is to provide a brake booster mechanism which exhibits a high degree of safety by providing means which causes the emergency fluid pressure to actuate the brakes only when the primary fluid source fails to operate.

A further object of the present invention is to provide a brake booster mechanism which is simple in construction as a result of using only one valve which controls the fluid communication between the source and the control chamber for actuating the power piston for the brakes, as well as for controlling the fluid communication between the emergency fluid pressure source and the control chamber.

A still further object of the present invention is to provide a brake booster mechanism which includes a flow divider between the source and the power steering mechanism, a control valve actuated by means of the brake pedal for applying the brakes, and a change-over valve, for the emergency application of the brakes, actuated by means of the divider upon the failure of the source.

BRIEF DESCRIPTION OF THE DRAWINGS

Various other objects, features, and attendant advantages of the present invention will be more fully appreciated as the same becomes better understood from the following detailed description when considered in connection with the accompanying drawings, wherein:

The sole FIGURE is a cross-sectional view of a hydraulic brake booster, within a circulating fluid system, constructed in accordance with the present invention and showing its cooperative parts.

DETAILED DESCRIPTION OF A PREFERRED EMBODIMENT

Referring now to the drawing, a fluid brake booster mechanism, generally indicated by the reference character 10, is adaptable for use with an open or circulating fluid pressure system which is to be used, for example, within a power steering system. A constantly operating fluid pump 11, which is driven by means of an engine, not shown, of the vehicle is hydraulically connected to a reservoir 12 by means of a line 13 so as to supply or circulate pressurized fluid to the brake booster 10 through means of a line 14. The fluid pressure is thereafter transmitted to a power steering mechanism 15, which is schematically illustrated, by means of a line 16 and is then returned to the reservoir 12 by means of a line 17.

Parts of the brake booster 10 occupy the positions shown within the drawing during normal operating conditions wherein, for example, both the brake booster 10 and the power steering mechanism 15 are in their non-operating conditions, however, the pump 11 continuously circulates the pressurized fluid. The brake booster 10 includes a housing 18 having an inlet port 19 for receiving the fluid pressure from the pump 11 through means of the line 14 and an outlet port 20 for delivering the fluid pressure to the power steering mechanism 15 through means of the line 16.

The housing 18 is provided with a stepped bore having large and small bores 21 and 22, respectively, and one end of the large bore 21 is adapted to be closed by means of a plug 23 sealingly secured therein, while the other end thereof sealingly receives therein a slidable power piston 24 having O-ring seals at opposite ends thereof, a control chamber 25 and a drain chamber 26 thus being defined within the large bore 21. A return spring 27 for the power piston 24 has one end seated against the plug 23 and its opposite end seated against the power piston 24 so as to thereby bias the power piston 24 in the right direction whereby the power piston 24 engages a shoulder 28 of the housing 18. The drain chamber 26 is open to a drain port 29 provided within housing 18 and is connected to reservoir 12 by means of line 17.

The power piston 24 has a bore defined therein which contains a sleeve 30, a seat member 31 and an output rod 32 being coaxially arranged therewith. The left end of the output rod 32 extends through the plug 23 and is operatively associated with a master cylinder, not shown, in the conventional manner so as to supply the brake pressure to the wheel cylinders, and a nut 33 secures the sleeve 30, the seat 31, and the rod 32 in fluid tight condition to the power piston 24 so that they are integrally movable as one piece. The sleeve 30 is also provided with a longitudinal bore 34 which contains a spool 35 therein, and the spool 35 is operatively connected to, and slidably moved by means of, an input piston 36 a large diameter portion 37 of which is slidably inserted within a bore 38 of the nut 33. The input piston 36 which is slidable within the small bore 22 of the housing 18 is mechanically connected to, and operated by means of, a brake pedal, not shown, through means of push rod 39.

Slidably disposed within the spool 35 is a rod member 40, and a spring 41 is interposed between the seat 31 and the rod member 40 so as to thereby bias the rod 40 toward the right whereby the large diameter portion 37 of the input piston 36 is urged into contact with a shoulder 42, provided upon the nut 33, through means of the spool 35. The sleeve 30 has first and second grooves 43 and 44 and a radial passage 45, the groove 44 and the passage 45 being in hydraulic communication with each other. An axially extending passage 46 provided within the power piston 24 permits fluid communication between passage 45 and the drain chamber 26, and the groove 43 is likewise in fluidic communication with an annular groove or chamber 47 defined between the outer periphery of the power piston 24 and the inner wall of the housing 18 through means of radially extending passages 48 and 49 formed within the sleeve 30 and the power piston 24, respectively.

A chamber 50 defined by means of the spool 35 and the seat 31 and is always in communication with the control chamber 25 through means of the passages 51 and 52, and the spool 35 has first and second lands 53 and 54 and a groove 55 provided thereon, so that the land 53 permits fluid communication between the passage 45 and the chamber 50 while the land 54 permits fluid communication between the grooves 43 and 44 through means of the groove 55 when the spool 35 is in its illustrated normal position. The right end of the rod 32 to which the seat member 31 is secured has a chamber 56 therein which contains a ball 57 positioned therein by means of a retainer 58, and the ball 57 is urged into contact with the seat 31 by means of a spring 59 interposed between the retainer 58 and an inner shoulder wall of the rod 32 whereby an axial passage 60 provided within seat 31 is closed. This results in the communication between chambers 56 and 52 being open or completed only when the rod 40 engages the ball 57 so as to cause the latter to move away from the seat 31 depending upon the movement of the spool 35 and the input piston 36.

The spool 35, the rod 40, and the ball 57 serve as the booster control valve means and they are arranged and designed such that the initial movement of the spool 35, caused by movement of the input piston 36, interrupts the fluidic communication between passage 45 and the chamber 50 by means of the land 53. Thereafter, the rod 40, which follows the movement of the spool 35, disengages the ball 57 from the seat 31 so as to establish communication between chambers 56 and 50, and subsequently, land 54 of spool 35 reduces or throttles the fluidic communication between the grooves 44 and 55 in accordance with the further movement of the spool 35. It is to be noted that the diameter of the land 54 upon spool 35 is slightly smaller than that of the inner peripheral surface of piston 30, and in this manner, an annular orifice is defined between the land 54 and the inner wall of the sleeve 30 even when the input piston 36 is moved toward the left position wherein the input piston 36 contacts sleeve 30, and passage 48 is connected to groove 44 through means of the orifice noted above.

The plug 23 includes a stepped outer periphery and a groove, not numbered, which defines a chamber 61 with respect to the inner wall of the housing 18 and is further provided with an interior bore for defining another chamber 62 containing the output rod 32. The chambers 61 and 62 are fluidically connected to each other through means of a radially extending passage 63 defined with plug 23, the chamber 62 leading to the chamber 56 through means of radial and axial passages 64 and 65, respectively, provided within rod 32.

The housing 18 further includes a bore 66, arranged parallel to the bores 21 and 22, and an inlet-outlet port 67 which is open to the bore 66 and which is fluidically connected with an accumulator 68 through means of a conduit 69. A plug 70 provided with O-ring seals, is inserted within the open end of the bore 66, and a spool valve 71 is slidably disposed within the bore 66 thereby defining, along with plug 70, two chambers 72 and 73 within the housing 18. The plug 70 has a stepped outer periphery so that an annular chamber 74 leading to the port 67, and another annular chamber 75, leading to the chamber 61 through means of a radial passage 76 provided within the housing 18, are formed with respect to the inner wall of the housing 18. The chamber 75 is connected to a check valve 77, passages 78 and 79 within the housing 18, and the inlet port 19, and the check valve 77, biased by means of a spring, not numbered, serves to permit the fluid to flow only in the direction extending from the inlet port 19 to the chamber 75, and interrupts the fluid flow from chamber 75 to port 19.

The plug 70 also has a bore 80 which accommodates a seat member 81 fixedly secured therein so as to thereby define a chamber 82, and an annular chamber 83, which is defined within the outer periphery of the seat 81 and the plug 70, is connected to the chamber 75 through means of a radial passage 84 provided within the plug 70. The seat 81 is provided with an axial bore 85 both ends of which are open, and the bore 85 communicates with the chamber 83 by means of a radial passage 86 defined within seat 81. Disposed within chamber 82 is a ball 87 which is engageable with the seat 81 so as to control the fluid communication between chamber 82 and bore 85, and the ball 87 is biased, by means of a spring 88, in the direction whereby communication between chamber 82 and bore 85 is blocked. The spring 88 has one end seated against a retainer 89 which is biased into contact with the ball 87 by means of the spring, and has its opposite end seated against a valve member 90.

A passage 91 defined within plug 70, and leading to the chamber 74, is connected to the chamber 82 through means of the valve 90 having an orifice 92 therein for controlling the fluid communication therebetween. The seat 81 is provided therein with still another chamber 93 at the end opposite that within which chamber 82 is disposed, and another ball 94 and a rod member 95 are disposed within chamber 93. Another rod member 96 is likewise disposed within the bore 85 between the balls 87 and 94, and the balls 87 and 94 and the rod members 95 and 96 are operatively connected with each other.

In the illustrated normal condition, the ball 87 is in contact with the seat 81 by means of the spring 88, the ball 94 is disengaged from the seat 81, and the rod member 95 is in its extreme right position within which the right end 97 thereof extends into the chamber 72 so as to be engageable with the spool valve 71. As will be apparent hereinafter, the leftward movement of the spool valve 71 in turn causes the effective movements of the rod member 95, the ball 94, and the rod member 96 in the same direction, and accordingly, the ball 94 engages the seat 81 so as to block the fluid communication between the chamber 93 and the bore 85, while the ball 87 is disengaged from the seat 81 by means of the rod member 96, against the biasing force of the spring 88, so as to establish fluid communication between the chamber 82 and the bore 85. In this manner, the seat 81 and the ball 87 serve as a change-over valve means.

The inner wall of the housing 18 which defines the bore 66 is also provided with two grooves 98 and 99 which have variable orifice means 100 and 101, respectively provided in conjunction with the slidable spool valve 71. The variable orifice 100 is fluidically connected to the inlet port 19 through means of the passage 79 and a groove 102 formed upon the spool valve 71, and is also fluidically connected to the chamber 72 by means of an axially extending passage 103 provided within the spool valve 71, the variable orifice 101 likewise controlling the fluid communication between chamber 73 and the groove 99. The groove 98 is fluidically connected to the outlet port 20 while the groove 99 is similarly connected to the annular chamber 47 by means of a radial passage 104 within housing 18. The spool valve 71 is provided with a bore 105, at the right side thereof, which contains a spring 106 interposed between the shoulder defining the bore 105 of the spool valve 71 and the inner end wall of the housing 18 so that the spool valve 71 is biased toward the left, however, it is to also be noted that within the illustrated normal condition, the spool valve 71 is balanced by means of the fluid pressure supplied from pump 11, as will be apparent hereinafter, whereby contact between the rod member 97 and the spool valve 71 is not established.

The chamber 73 is fluidically connected to the inlet port 19 through means of the passages 79 and 78, a radial passage 107 provided within the housing 18, and a radial passage 108 provided within the spool valve 71. A threaded member 109 is threadedly engaged within the housing 18 and has an extending or projecting portion which extends into the passage 107 so as to thereby define an orifice 110 therein. The movement of the spool valve 71 is such as to control both of the orifices 100 and 101 at the same time, that is, the leftward movement of the spool valve 71 serves to reduce the size of the passage including the variable orifice 100 and to increase the size of the passage including the variable orifice 101, and the rightward movement of the spool valve 71 serves to increase the size of the variable orifice passage 100 and to reduce the size of the variable orifice passage 101. Consequently, the pressure difference between the fluid pressures within the chambers 72 and 73 is substantially constant, depending upon the biasing force of the spring 106, regardless of the fluid pressure within the outlet port 20 or the passage 104, as long as the fluid pressure flows from the inlet port 19 to the outlet port 20 through means of the orifice 100.

Assuming that the biasing force of the spring 106 is F, the cross-sectional area of the spool valve 71 is A, and the difference in pressures between the chambers 72 and 73 is $\Delta P$, the spool valve 71 is balanced under the equality $\Delta P \cdot A = F \cdot \Delta$. If $F = 4$ Kg and $A = 2$ cm$^2$, then the fluid pressure within chamber 72 can be set high, on the order of 2 Kg/cm$^2$, in comparison with the fluid pressure within the chamber 73. In this condition the fluid flow from the orifice 110 into the chamber 73, that is to say, the fluid flow to the passage 104, is substantially constant because the chambers 72 and 73 are fluidically connected to each other by means of the orifice 110 and the difference in pressure between the chambers 72 and 73 is substantially constant, it being appreciated that the spool valve 71 also serves as a fluid divider valve means. When the pump 11 circulates or delivers the fluid pressure to the inlet port 19, the spool valve 71 is slidable, however, the spool valve 71 is designed such that it does not engage the rod 97 under such slidable movement conditions, the spool valve 71 being movable toward the left by means of the biasing force of the spring 106 and being engageable with the rod 97 only when the pump 11 fails to operate, such as, for example, when the fluid pressure within inlet port 19 drops below a predetermined value, which value is on the order of 0 Kg/cm$^2$.

In operation, during the normal conditions wherein no brake application is made and no power steering correction is also made, the pump 11 circulates the fluid pressure from the reservoir 12 to the inlet port 19 whereby the chamber 72 receives the fluid pressure from the inlet port 19 which pressure acts upon the left end of the spool valve 71 and tends to bias the spool valve 71 toward the right against the biasing force of the spring 106. Accordingly, the fluid pressure within chamber 72 increases to such a degree that the fluid pressure within chamber 72 overcomes the biasing force of the spring 106 and causes the spool valve 71 to in fact move toward the right. This movement of the spool valve 71 accordingly opens the variable orifice 100 so as to convey the fluid pressure being circulated to the outlet port 20, the fluid pressure then being returned to the reservoir 12 through means of the conduit 16, the power steering mechanism 15, and the conduit 17.

A part of the fluid flow which is substantially constant is also returned from the inlet port 19 to the reservoir 12 through means of the flow path which includes passage 78, orifice 110, chamber 73, passage 104, chamber 47, passages 49 and 48, grooves 43, 55, and 44, passages 45 and 46, chamber 26, passage 29, and conduit 17, and therefore, the spool valve 71 is now balanced by means of the biasing force of the spring 106, which biases the spool valve 71 toward the left, and the difference in pressures between the chambers 72 and 73 which is substantially constant and which biases the spool valve 71 toward the right while the spool valve 71 is reciprocated slightly back and forth so as to control the orifice 100. Under this condition, the control chamber 25 is fluidically connected to the drain chamber 26 by means of the chamber 50 and the passage 45, whereby the power piston 24 remains at its illusrated position.

When a power steering correction is being made, but a brake application is not being made, the fluid pressure within the passages 16, 20, 19, and 14 increases in accordance with the demand of the power steering corrections, and at this time, the fluid pressure within the chamber 72 also increases correspondingly. Consequently, the spool valve 71 is moved toward the right so as to throttle or reduce the orifice 101 thereby increasing the fluid pressure within the chamber 73 in a corresponding manner. The difference in pressure between both chambers 72 and 73 still remains substantially constant, and the fluid flow to the passage 104 through means of the orifice 110 and the chamber 73 also remains substantially constant. Uner these conditions, the increased fluid pressure within the passage 78 opens the check valve 77 and is then transmitted to the chamber 56 through means of the flow chambers and passages 75, 76, 61, 63, 62, 64 and 65. Since the ball 57 blocks the communication between chambers 56 and 50, however, the control chamber 25 does not receive any fluid pressure and the power piston 24 remains in its illustrated position.

At this time, the fluid pressure transmitted from the chamber 75 to the bore 85 disengages the ball 87 from the seat 81 against the biasing force of the spring 88, and therefore, the fluid pressure, which has a sufficiently high value, is transmitted to the accumulator 68 by means of the fluid flow path which includes the chambers and conduits 91, 74, 67 and 69, so as to be accumulated within the accumulator 68. This operation is repeated and the fluid pressure is prepared within the accumulator 68 for an emergency, such as for example, if a failure of the pump 11 occurs, the accumulated fluid pressure being prevented from returning to the reservoir 12 by means of the check valve means in the conventional well-known manner.

When the vehicle operator depresses the brake pedal during a power steering correction, the rod 39, the input piston 36, and the spool 35 are moved toward the left against the biasing force of the spring 41, and consequently, the land 53 of the spool 35 blocks the communication between the passage 45 and the chamber 50, and in like manner, fluid flow between the control chamber 25 and drain chamber 26 is also interrupted. Thereafter, the rod 40 disengages the ball 57 from the seat 31 against the fluid pressure within chamber 56 and the biasing force of the spring 59, and the fluid pressure, which is sufficiently pressurized, is now conveyed from chamber 56 to control chamber 25 by means of the passage 60 and the chamber 50 so as to cause the power piston 24 to move toward the left against the biasing force of the spring 27, the output rod 32 therefore being moved in the same direction so as to energize the master brake cylinder, not shown.

It is to be noted that the fluid pressure within the control chamber 25 depends upon or is controlled by means of the depression force upon the brake pedal by the operator. For example, if the fluid pressure within the control chamber 25 which is required for the braking operation is greater than the fluid pressure demanded for the power steering operation, further movement of the spool 35, which is dependent upon a further depression force upon the brake pedal by means of the operator, throttles the groove 55 by means of the land 54 thereof. The fluid communication between grooves 43 and 44, and more particularly between the passage 104 and the drain chamber 26, is therefore reduced so that the fluid pressure within chamber 73 is increased, and as a result, spool valve 71 is moved toward the left thereby correspondingly reducing the variable orifice 100. Thus the fluid pressure within chamber 72 is increased and the increased fluid pressure is transmitted to the chamber 56, which now communicates with chamber 72, and the control chamber 25 receives the increased fluid pressure so as to energize the master cylinder still further. When an excessive fluid pressure is conveyed to the control chamber 25, the input piston 36 is biased rearwardly thereby, and the spool 35 is also returned by means of the spring 41 so as to increase the groove passage 55 whereby the fluid pressure within chamber 73 is decreased, the fluid pressure within chamber 72, and more particularly the control chamber 25, likewise being decreased.

When a brake application is required, however a power steering correction is not being made, spool 35 blocks the fluidic communication between passage 45 and the chamber 50 and the rod 40 disengages the ball 58 from the seat 31, as will be apparent from the discussion presented hereinbefore, the control chamber 25 now being fluidically connected to the chamber 56. Further movement of the spool 35 causes the fluid pressure within the chamber 73 to increase, and therefore, the fluid pressure within chamber 72 is increased. Thus, the control chamber 25 receives the increased fluid pressure so as to actuate the power piston 24 for the brakes, as will also be apparent from the discussion hereinbefore.

When the operator imparts an excessive depression force to the input piston 36, the latter is moved toward the left until it contacts the sleeve 30, and the spool 35 is also moved to its extreme left position within which the land 53 thereof blocks the fluid communication between passage 45 and chamber 50, while land 54 serves to form the annular orifice permitting a minimum fluid flow with respect to the bore 34. The fluid flow from passage 104 to the drain chamber 26 is thus minimized, and the fluid pressure within chamber 73 increases to the maximum pressure previously set. Accordingly, the fluid pressure within control chamber 25, which is fluidically connected to the chamber 72, is increased to the maximum pressure which is greater than the maximum pressure within chamber 73 by a predetermined value depending upon the biasing force of the spring 106 and as a result, the fluid pressure still being circulated from the pump 11 is transmitted to the power steering mechanism 15 through means of the orifice 100, except that a sufficient fluid pressure is nevertheless still transmitted to the control chamber 25 so as to assure effective operation of the brakes in accordance with the effective increased volume of the control chamber 25 in accordance with the movement of the power piston 24.

When the driver releases the brake pedal, the input piston 36, the rod 40, and the spool 35 are returned backwardly by means of the fluid pressure within the chamber 25 as well as by means of the spring 41, and therefore, the ball 57 again engages with the seat 31 so as to block the communication between chambers 56 and 50. Thus, the chamber 50 is again open to the drain chamber 26 through means of the passage 45, and the fluid pressure within the control chamber 25 is now drained. At substantially the same time, the throttle operation at the grooves 43 and 55, by means of the land 54, is terminated, and consequently, the fluid pressure within the control chamber 25 becomes substantially the same as that within the drain chamber 26, and thus, the power piston 24 is returned to its original position. During the operation noted above, it is to be additionally noted that the spool valve 71 is not engaged with the rod 95, and consequently, no accumulated pressure within accumulator 68 is utilized.

When the pump 11 fails to operate, the fluid pressure within chamber 72 becomes 0 Kg/cm$^2$, and the spool valve 71 is biased toward the left, by means of the biasing force of 4 Kg of the spring 106, so as to contact rod 95, the ball 87 therefore being urged away from its seat and toward the open direction by means of the rod 95, the ball 94, and the rod 96. Although the ball 87 is urged toward the closed direction by means of the fluid pressure within the chamber 82 and the biasing force of spring 88, it is to be noted that the fluid pressure within the chamber 82 is approximately 50 Kg/cm$^2$, the effective area of the bore 85 is approximately 0.05 cm$^2$, and the biasing force of the spring 88 is approximately 0.1

Kg. Therefore, the biasing force of the spring 106 overcomes the force of 0.05 cm$^2$ × 50 Kg/cm$^2$, plus 0.1 Kg, that is, 2.6 Kg, and the ball 87 is disengaged from the seat 81 through means of the rod 96, the ball 94, the rod 95 and the spool valve 71.

As a result of the foregoing, ball 94 now engages the seat 81 whereby the bore 85 is connected to the chamber 82 and is disconnected from chamber 72, and consequently, the accumulator is connected to chamber 56 by means of the chambers, passages, and conduits, 69, 67, 74, 91, 82, 85, 86, 83, 84, 75, 76, 61, 63, 62, 64 and 65. Under these conditions, when the operator depresses the brake pedal, the control chamber 25 is disconnected from the drain chamber 26 and is connected to chamber 56, as will of course be apparent from the foregoing, in accordance with the movements of the input piston 36, spool 35, rod 40, and ball 57. In this manner, the control chamber 25 receives the accumulated fluid pressure from the accumulator 68 so as to thereby actuate the power piston 24 for the braking operation, and it may be noted that the valve member 90 may be disengaged from the inner wall of the plug 70 so as to increase the flow path. Upon the release of the brake pressure application, the control chamber 25 is again connected to the drain chamber 26 in the same manner noted hereinabove, and the power piston 24 is returned to its original position. When the accumulated fluid pressure decreases as a result of repeated brake applications during a failure of the pump, the input piston 36 is manually moved toward the left by means of the depression force impressed upon the brake pedal by means of the operator until it contacts sleeve 30 and therefore, the power piston 24 is manually moved toward the left for the braking operation by means of further depression strokes of the brake pedal.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A hydraulic brake booster mechanism for use with a circulating fluid pressure system including a source of continuously circulating fluid pressure, a power steering mechanism, and a passage means for connecting said source and said power steering mechanism, comprising:
    a housing disposed within said passage means and having an inlet port for receiving said fluid pressure from said source and an outlet port communicating with said power steering mechanism;
    an input piston means slidably disposed within said housing and operatively associated with a brake pedal;
    a power piston means slidably disposed within said housing for energizing a master brake cylinder;
    a control chamber interposed between said input and power piston means for actuating said power piston means;
    a control valve means actuated by said input piston means and movable between a first position wherein said control chamber receives the fluid pressure from said source and a second position wherein the fluid pressure within said control chamber is drained from said control chamber to a reservoir;
    a spool valve means slidably disposed within said housing and including a variable orifice means for controlling said passage means and a biasing means for biasing said spool valve means in a direction in which said orifice means is throttled, said spool valve means further comprising a first pressure receiving area which is subjected to the fluid pressure modulated by said control valve means for biasing said spool valve means in said direction, and a second oppositely disposed pressure receiving area which is subjected to the fluid pressure from said source;
    an accumulator means for accumulating an emergency supply of fluid pressure; and
    a change-over valve means, disposed within said housing so as to be operable independent of operation of said input piston means and said brake pedal and be actuated solely by said spool valve means which is displaced by said biasing means upon a failure of said source, for delivering said emergency fluid pressure to said control chamber upon actuation of said control valve means.

2. A hydraulic brake booster mechanism as set forth in claim 1, wherein said control valve means comprises:
    a normally closed valve interposed between said source and said control chamber and means for opening said normally closed valve depending upon the actuation of said input piston means; and
    said emergency fluid pressure is adapted to be delivered to said control chamber through said normally closed valve upon the failure of said source.

3. A hydraulic brake booster mechanism as set forth in claim 1, wherein:
    said second pressure receiving area of said spool valve means is adapted for receiving the fluid pressure from said source; and
    an orifice is interposed between said source and said second pressure receiving area of said spool valve means.

4. A hydraulic brake booster mechanism as set forth in claim 3, wherein said control valve means comprises:
    means for throttling the draining of said fluid pressure which exposes said first pressure receiving area to a higher pressure in response to the depression force impressed upon said brake pedal.

5. A hydraulic brake booster mechanism as set forth in claim 4, wherein:
    said variable orifice means is interposed downstream of said second pressure receiving area and upstream of said means for throttling the draining of said fluid pressure for controlling the fluid pressure therebetween in response to the movement of said spool valve.

6. A hydraulic brake booster mechanism as set forth in claim 1, wherein said change-over valve means comprises:
    a normally closed valve interposed between said accumulator means and said control valve means and adapted to be opened in response to the actuation of said spool valve means in response to mechanical abutment of a portion of said normally closed valve by said spool valve.

7. A hydraulic brake booster mechanism as set forth in claim 6, wherein said change-over valve means comprises:
    a valve seat;
    a ball valve normally disposed upon said valve seat for normally blocking fluid communication between said accumulator and said control chamber; and rod means operatively associated with spool valve means for unseating said ball valve from said valve seat upon failure of said source.

8. A hydraulic brake booster mechanism as set forth in claim 1, wherein:

a check valve means is disposed within said passage means between said inlet port and said control chamber; and said accumulator means is connected to said passage means downstream of said check valve means and upstream of said control chamber.

* * * * *